United States Patent [19]

Zondag

[11] 4,074,630

[45] Feb. 21, 1978

[54] METHODS AND PLUGS TO SEAL APERTURES IN TUBE PLATES OF HEAT EXCHANGERS PROVIDED WITH TUBE PLATES WHICH ARE LOCALLY SEALED WITH THESE METHODS AND SUCH PLATES

[75] Inventor: Nicolaas Abraham Zondag, Roosendaal, Netherlands

[73] Assignee: Explosive Metal Working Holland B.V., Roosendaal, Netherlands

[21] Appl. No.: 767,454

[22] Filed: Feb. 10, 1977

Related U.S. Application Data

[62] Division of Ser. No. 662,045, Feb. 27, 1976, Pat. No. 4,021,907.

[51] Int. Cl.² .................... F42B 3/04; F16L 55/10; F28F 11/00
[52] U.S. Cl. .................................. 102/24 R; 138/89; 138/97; 165/76
[58] Field of Search ................ 102/24 R; 138/89, 97; 29/421 E; 165/137, 76

[56] References Cited
U.S. PATENT DOCUMENTS

| | | | |
|---|---|---|---|
| 3,203,479 | 8/1965 | Hindman | 138/89 |
| 3,555,656 | 1/1971 | Brown et al. | 165/76 |
| 3,590,877 | 7/1971 | Leopold et al. | 138/89 |
| 3,724,062 | 4/1973 | Cantrell et al. | 138/89 |
| 3,785,291 | 1/1974 | Bergbauer et al. | 138/89 |
| 3,919,940 | 11/1975 | Ploger et al. | 138/97 |

*Primary Examiner*—Charles J. Myhre
*Assistant Examiner*—Sheldon Richter
*Attorney, Agent, or Firm*—Snyder, Brown & Ramik

[57] ABSTRACT

A method and a plug to seal a defective tube of a heat exchanger in the place, where said tube extends in a tube plate, said plug being inserted in the tube plate and having two coaxial cavities, each of which is open at one end and contains an explosive charge and firing means, and said plug being jammed in the tube plate in a gas and liquid tight manner by its radial expansion due to the explosion of its charges — and a heat exchanger, of which at least one of its tubes has been plugged by means of the described plugs.

5 Claims, 8 Drawing Figures

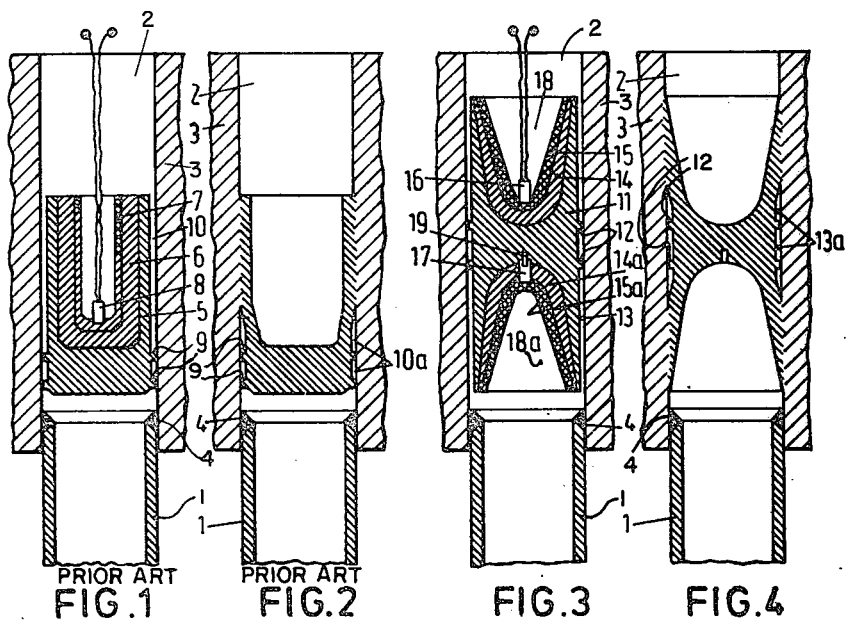
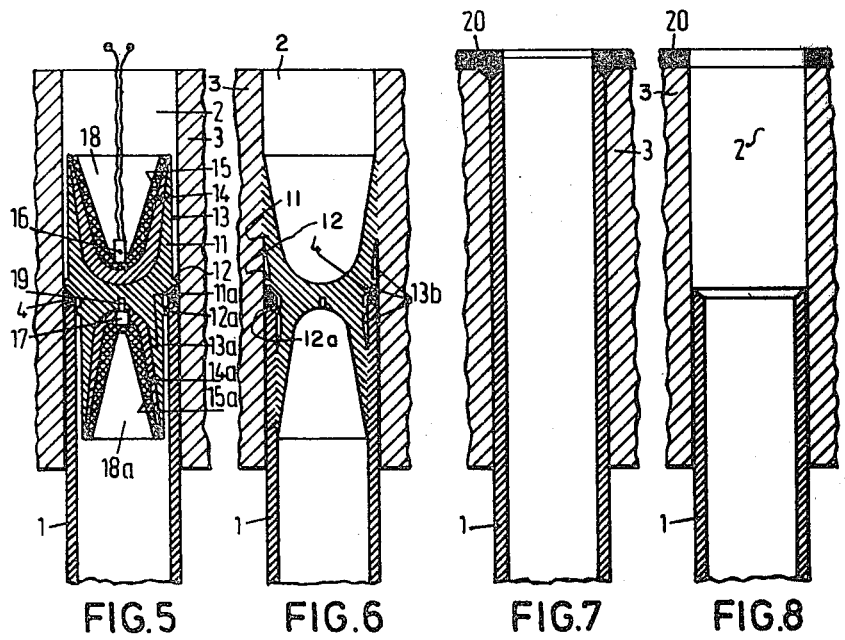

METHODS AND PLUGS TO SEAL APERTURES IN TUBE PLATES OF HEAT EXCHANGERS PROVIDED WITH TUBE PLATES WHICH ARE LOCALLY SEALED WITH THESE METHODS AND SUCH PLATES

This is a division of application Ser. No. 662,045, filed Feb. 27, 1976, now U.S. Pat. No. 4,021,907.

The invention relates in the first place to a method of sealing an aperture in a tube plate in the place, where a tube of a heat exchanger extends with an end portion in a boring of said plate and is welded to said plate by means of a hollow metal plug containing locally explosive material and firing means, said plug being inserted into the cavity within said plate and so radially expanded by detonation of said explosive material as to form a gas and liquid tight bond with the wall of the heat exchanger surrounding said cavity, in the second place to a heat exchanger provided with at least one tube plate sealed locally with said method and in the third place to a plug, by means of which said method is carried out.

It has appeared that a cup-shaped explosively radially expandable plug, that means a plug with one single cavity opening towards an end of the plug, does not produce good results in the long run, since even after the detonation of the explosive charge a gap which is accessible to one of the two fluids flowing through the heat exchanger is left near the bottom of said cavity and between the plug and the surface of the heat exchanger surrounding the latter, so that gap corrosion can occur between the plug and the surface of the tube plate or the tube surrounding same.

The invention has the object to avoid the danger of gap corrosion in locally sealed tube plates of heat exchangers. This is achieved in that a plug is used in which two coaxial cavities are separated from one another by a partition, said cavities opening each towards an individual end of the plug and containing each an explosive charge with a firing means, and that, after said plug has been placed in position in the cavity concerned within the tube plate both charges are simultaneously or nearly simultaneously fired. In this case the partition which is the bottom of the two cavities of the plug comes to lie between two wall portions thereof which surround the cavities and are united in a gapless manner with the surrounding surface of the heat exchanger by the detonation of these charges, so that the gap left near said partition becomes inaccessible for both fluids flowing through the heat exchanger.

To fire both charges the explosive charge pointing outwards in respect of the tube may be fired from the outside and the explosive charge pointing inwards in regards to the tube may be fired by the shock of the detonation of the first mentioned charge. It is then not necessary to pass firing means through the partition of the plug due to which leakage could occur after the detonation.

In order to prevent that at and near the ends of the plug the wall portions thereof are not entirely united in a gapless way with the surrounding wall, it is recommended to use a plug with a double charge, in which the cavities of the plug widen gradually towards their open ends. The cavities may then have such a conical, parabolic or otherwise widening shape that the edges around the open ends of said cavities become sharp.

To seal a boring in a tube plate, in which at least the tube to be sealed extends over a portion of the thickness of said plate only, a plug having two explosive charges may be used which is only inserted into the free portion of the boring concerned and is united in a gas and liquid tight manner with the wall of said boring only by the detonation of its charges. However, in some cases also a plug having two explosive charges may be used which is inserted with its portion containing the charge pointing inwards in respect of the tube concerned into said tube and with its portion containing the charge pointing outwards in regard to said tube into the fire portion of the respective boring, so that, when said charges are fired, on one hand a gas and liquid tight bond is formed between the inwards pointing portion of the plug and the inner surface of the tube and on the other hand such a bond is formed between the outwards pointing portion of the plug and the surface of that boring. This method, for which one has to use a plug, the outer diameter of the portion surrounding one cavity of which is smaller than that of the portion surrounding the other cavity, may also be used to seal locally a tube plate, in which the tube extends throughout the entire thickness of said plate. However, then it is necessary to drill the tube to be sealed out over a portion of the thickness of said plate before the plug containing the double charge is placed in position within the tube plate. Tubes which extend entirely through the tube plate are mostly welded to said plate on the side thereof remote from the tubes. Consequently, if such a tube is drilled out over a certain length from said side of the tube plate it becomes loose in the tube plate. Now by means of the plug which extends partly in said tube and partly in the respective boring of the tube plate said tube is not only sealed but also mechanically attached to the tube plate after the detonation of the charges.

It is also possible to seal such a defective tube extending throughout the entire tube plate and to weld same again to the tube plate by means of a plug which is only inserted into said tube in order to avoid leakage.

As already mentioned the invention also relates to heat exchangers, of which the tube plates each contain at least one sealed tube, in which the plug used therefor has two coaxial cavities which are separated from one another by a partition and are each opened towards an individual end of the plug, said plug being with only its wall portions surrounding said cavities united in a gas and liquid tight manner with the surface of the heat exchanger surrounding said plug. The plug may then extend either in the boring of the tube plate only, or partly in said boring and partly in said tube, or entirely in said tube.

Furthermore, the invention covers a metal plug to carry out the described methods, said plug being provided with two coaxial cavities separated from one another by a partition, each opening to an individual end of the plug and each containing an explosive charge with a firing means. Depending on the way, in which such a plug is placed in position in the tube plate the outer diameters of the plug portions surrounding the cavities may be equal or different. One cavity of the plug may then contain a firing means which is operable from the outside, e.g. an electric firing device, and the other cavity may then contain a percussion member, such as a loose percussion pin or a loose percussion plate, which lies against the partition of the plug.

Furthermore, the cavities of the plug may widen gradually towards the open ends thereof, for instance in such manner, that the thickness of the wall surrounding the cavities is almost reduced to nil at the edges of the cavities.

The invention will be further elucidated with the aid of the drawing. In the drawing is:

FIG. 1 a sectional view of a part of a tube plate of a heat exchanger with a tube secured thereto and of an explosively expandable metal plug of known construction inserted in said plate to seal said tube, FIG. 2 a sectional view of the part of the tube plate with the tube shown in FIG. 1, after the explosive charge of said plug has been fired, FIG. 3 a sectional view of a part of a tube plate of a heat exchanger with a tube secured thereto and of an explosively expandable metal plug according to the invention which is inserted in said plate, FIG. 4 a sectional view of the part of the tube plate with the tube shown in FIG. 3, after the explosive charges of said plug have been fired, FIG. 5 a sectional view of a part of a tube plate with a tube secured thereto of a slightly differently constructed heat exchanger and of an explosively expandable metal plug which is inserted partly in said plate and partly in said tube, FIG. 6 a sectional view of the part of the tube plate with the tube shown in FIG. 5, after the explosive charges of the plug have been fired, FIG. 7 a sectional view of a part of a tube plate with a tube of another slightly differently constructed heat exchanger and FIG. 8 a sectional view of the tube plate with the tube shown in FIG. 7, after the tube has been drilled out over a portion of the thickness of the tube plate.

In FIGS. 1 and 2 and in FIGS. 3 and 4 the tubes 1, of which only one has been shown, are inserted with their one ends in fitting borings 2 of a tube plate 3 and these tubes are welded to the tube plate at 4, that means near the end of said boring facing the tube. Should the weld 4 become leaky or should the tube 1 become torn, the boring 2 will have to be temporarily sealed in a gas and liquid tight manner by means of a plug, since otherwise the two fluids flowing through the heat exchanger would contact each other through the leak or the tear.

It has already been proposed to use for sealing a boring of a tube plate and the tube opening therein an explosively expandable metal plug of the structure shown in FIGS. 1 and 2. This plug consists of a cup-shaped metal body 5, of which the outer diameter is slightly smaller than the diameter of the boring 2 and in the cavity of which a plastic layer 6, say a layer of synthetic material, a layer of explosive substance 7 and a firing device 8 which is electrically operable from the outside are contained. In order to centre the plug 5 it is provided with circumferential ribs 9 which make that between the plug 5 and the wall of the boring 2 a gap 10 is left which is necessary to produce a gas and liquid tight bond between the plug 5 and the tube plate 3 after the explosion of the substance 7 has taken place.

This known plug has the disadvantage that the portion 10a of the gap 10 which remains in existance even after the explosive substance 7 has been fired remains in open communication with one of the fluid spaces, that means in the present case with the space within the leaking tube 1, consequently, after that tube has been sealed by the plugs, with the space of the heat exchanger surrounding the tube. It has appeared that the danger of corrosion in such a gap is considerable, when one end thereof is closed.

In accordance with the invention the plug shown in FIGS. 3 and 4 has a metal body 11 with centring ribs 12, so that the body fits the boring 2 of the tube plate 3 with clearance caused by the gap 13. This plug body has two cavities 18, 18a, each of which opens towards an end of the plug and contains a plastic layer 14, 14a, an explosive charge 15, 15a and a firing device 16, 17 (FIG. 3). The firing device 16 can be operated electrically from the outside and the firing device 17 can be set in operation by the percussion pin 19 which is mounted for axial movement in the body 11 and is driven with force into the explosive ignition material of the device 17 by the detonation of the charge 15.

It appears from FIG. 4 that, when the charges 15, 15a are fired, both end portions of the plug 11 are united with the tube plate 3 in a gapless manner, so that the remaining portion 13a of the gap 13 becomes separated from both spaces of the heat exchanger for the fluids flowing therethrough. Thereby the danger of gap corrosion is avoided.

The plug shown in FIGS. 5 and 6 differs from that illustrated in FIGS. 3 and 4 only in that the portion 11a facing the tube 1 has such a small diameter that it fits in the tube 1 and leaves a gap 13a. This plug may be used, when the tubes extend in the borings 2 of the tube plate 3 over about half the thickness of the latter. FIG. 6 illustrates that when the two charges 15, 15a are fired the portion 11 of the plug becomes united in a gas and liquid tight manner with the tube plate and the portion 11a of the plug is secured in a gas and liquid tight manner to the tube 1. Also in this case the portion 13b of the original gap 13, 13a, which remains in existance between the tube plate 3, the tube 1 and the plug 11, 11a, is separated from both spaces of the heat exchanger.

As the plug 11, 11a shown in FIGS. 5 and 6 produces an additional weld between the tube 1 and the tube plate 3, it may also be used in heat exchangers, of which the tubes 1 extend throughout the entire tube plate 3 and are welded by a layer of corrosion resisting material 20 to the tube plate on the side thereof remote from the bundle of pipes as is shown in FIG. 7. Should such a tube or the weld become leaky said tube could be drilled out over half the thickness of the tube plate 3, as is shown in FIG. 8. After said drilling the tube 1 becomes loose in the tube plate 3. However, if thereupon a plug 11, 11a shown in FIG. 5 is inserted partly into the boring 2 and partly into the tube 1 and said plug becomes united in a gas and liquid tight manner with its one portion with the tube plate and with its other portion with the tube by the detonation of its two charges, not only the detected leak is closed but also the tube is welded to the tube 2 again.

It is observed, that the cavities of the plugs 11 and 11, 11a shown in FIGS. 3, 4 and 5, 6 respectively may be cylindrical, as is shown in FIGS. 1 and 2. However, it is preferred to use cavities which widen towards the open ends thereof and have for instance a conical shape. As a result thereof a gapless connection is obtained with a fair degree of certainty between the end portions of the plug and the surfaces of the heat exchanger.

Should in the cases shown in FIGS. 5, 6 and 7, 8 only the bond or weld between the tube and the tube plate be leaky and should it be impossible to repair said bond or weld the plug 11 or 11, 11a could take over the function of the weld. The plug could then be bored through, after it has been inserted and fired, so that the tube can remain active in the heat exchanger.

It will be obvious that the plug having a double charge has the additional advantage, that the rocket effects of the exploding charges compensate each other, so that the danger of damaging the weld between the tube and the tube plate owing to the sudden movement of the plug caused by the detonation is reduced nearly to nil.

What I claim is:

1. An explosively radially expandable plug to seal an aperture in a tube plate of a heat exchanger in a place, where a tube extends with an end portion in a boring of said plate, said plug having a metal body with two coaxial walls forming cavities separated from one another by a partition and each one of said cavities opening towards an individual end of the plug and containing an explosive charge with firing means.

2. A plug as claimed in claim 1, in which the outer diameters of the walls surrounding said cavities are equal.

3. A plug as claimed in claim 1, in which the outer diameter of the wall surrounding one cavity is smaller than that of the wall surrounding the other cavity.

4. A plug as claimed in claim 1, in which the firing means co-operating with the explosive charged contained in one cavity are operable from the outside and the firing means co-operating with the explosive charge contained in the other cavity are provided with a percussion member which lies against the partition of the plug.

5. A plug as claimed in claim 1, in which the cavities thereof gradually widen towards the open ends of the plug.

* * * * *